United States Patent
Xu et al.

(10) Patent No.: US 11,252,538 B2
(45) Date of Patent: Feb. 15, 2022

(54) MESSAGE SENDING METHOD AND DEVICE

(71) Applicant: HUAWEI TECHNOLOGIES CO., LTD., Shenzhen (CN)

(72) Inventors: Bei Xu, Xi'an (CN); Jiaxin Yin, Nanjing (CN); Yongjing Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 16/727,351

(22) Filed: Dec. 26, 2019

(65) Prior Publication Data

US 2020/0137530 A1    Apr. 30, 2020

Related U.S. Application Data

(63) Continuation of application No. PCT/CN2018/093047, filed on Jun. 27, 2018.

(30) Foreign Application Priority Data

Jun. 30, 2017 (CN) .......................... 201710527186.X
Sep. 30, 2017 (CN) .......................... 201710922636.5

(51) Int. Cl.
*H04W 4/08* (2009.01)
*H04W 4/70* (2018.01)
(Continued)

(52) U.S. Cl.
CPC ............ *H04W 4/08* (2013.01); *H04W 4/70* (2018.02); *H04W 72/005* (2013.01); *H04W 72/121* (2013.01)

(58) Field of Classification Search
CPC ....... H04W 4/08; H04W 4/70; H04W 72/005; H04W 72/121; H04W 4/06;
(Continued)

(56) References Cited

U.S. PATENT DOCUMENTS

2009/0327933 A1* 12/2009 Dunn ................... G06F 16/447
                                                              715/764
2011/0128911 A1    6/2011 Shaheen
(Continued)

FOREIGN PATENT DOCUMENTS

CN          102668493 A        9/2012
CN          103428830 A       12/2013
(Continued)

OTHER PUBLICATIONS

Samsung, ZTE, Cleanup for Solution: Use of MBMS for Group Message Delivery, 3GPP TSG-SA WG2#108 S2-151174, Apr. 13-17, 2015, total 5 pages.
(Continued)

*Primary Examiner* — Charles C Jiang
*Assistant Examiner* — Shawn D Miller
(74) *Attorney, Agent, or Firm* — Hauptman Ham, LLP

(57) ABSTRACT

A message sending method includes obtaining, by a group management server, a message sending period interval corresponding to a first group. The the message sending period interval includes a start time and an end time. The method also includes sending, by the group management server, the message sending period interval to a group member of the first group. The method further includes receiving, by the group management server, a first message sent by an application server. The method additionally includes sending, by the group management server, the first message to the group member of the first group within the message sending period interval.

19 Claims, 10 Drawing Sheets

(51) Int. Cl.
*H04W 72/00* (2009.01)
*H04W 72/12* (2009.01)

(58) Field of Classification Search
CPC . H04W 52/0219; Y02D 30/70; H04L 12/185; H04L 67/325; H04L 67/12; H04L 51/14
See application file for complete search history.

(56) References Cited

U.S. PATENT DOCUMENTS

| | | | |
|---|---|---|---|
| 2015/0099555 A1 | 4/2015 | Krishnaswamy et al. | |
| 2015/0382157 A1 | 12/2015 | Xu | |
| 2016/0007138 A1* | 1/2016 | Palanisamy | H04W 4/50 455/41.2 |
| 2018/0352416 A1* | 12/2018 | Ryu | H04W 4/70 |
| 2019/0174280 A1* | 6/2019 | Xu | H04L 67/12 |

FOREIGN PATENT DOCUMENTS

| | | |
|---|---|---|
| CN | 103702344 A | 4/2014 |
| CN | 103947233 A | 7/2014 |
| CN | 104012125 A | 8/2014 |
| CN | 104703116 A | 6/2015 |
| CN | 104704895 A | 6/2015 |
| CN | 106102022 A | 11/2016 |
| EP | 2862374 B1 | 11/2019 |
| JP | 2013511941 A | 4/2013 |
| JP | 2016536860 A | 11/2016 |
| WO | 2011129643 A2 | 10/2011 |
| WO | 2015045232 A1 | 4/2015 |

OTHER PUBLICATIONS

Huawei, Hisilicon, Solutions on Message delivery to a group of devices [online], 3GPP TSG-SA WG2#105 S2-143232,Oct. 13-17, 2014,total 5 pages.

Japanese Office Action issued in corresponding Japanese Application No. 2019-572471, dated Feb. 24, 2021, pp. 1-5.

XP051295447 3GPP TR 23.730 V14.0.0 (Dec. 2016),3rd Generation Partnersh ip Project;Technical Specification Group Services and System Aspects;Study on extended architecture support for Cellular Internet of Things (CIoT) (Release 14),total 84 pages.

XP051309173 3GPP TS 23.682 V15.1.0(Jun. 2017),3rd Generation Partnership Project; Technical Specification Group Services and System Aspects;Architecture enhancements to facilitate communications with packet data networks and applications (Release 15),total 118 pages.

3GPP TS 23.246 V14.1.0 (Dec. 2016),3rd Generation Partnership Project;Technical Specification Group Services and System Aspects;Multimedia Broadcast/Multicast Service (MBMS);Architecture and functional description(Release 14), total 76 pages.

International search report dated Oct. 11, 2018 from corresponding application No. PCT/CN2018/093047.

Extended European search report dated Feb. 26, 2020 from corresponding application No. EP 18823519.6.

Chinese Office Action issued in corresponding Chinese Application No. 201710922636.5, dated Nov. 2, 2020, pp. 1-10, State Intellectual Property Office of the People's Republic of China, Beijing, China.

* cited by examiner

MESSAGE SENDING METHOD AND DEVICE

CROSS-REFERENCE TO RELATED APPLICATIONS

This application is a continuation of International Application No. PCT/CN2018/093047, filed on Jun. 27, 2018, which claims priority to Chinese Patent Application No. 201710527186.X, filed on Jun. 30, 2017, and Chinese Patent Application No. 201710922636.5, filed on Sep. 30, 2017. All of the aforementioned patent applications are hereby incorporated by reference in their entireties.

TECHNICAL FIELD

This application relates to the field of communications technologies, and in particular, to a message sending method and a device.

BACKGROUND

The Internet of Things (IoT) standardization organization oneM2M is committed to developing technical specifications used to construct a common machine to machine (M2M) communication application layer. Currently, oneM2M supports group management in an IoT scenario, including operations of adding, deleting, updating, and retrieving group resources, and operations of adding, deleting, updating, and retrieving resources of group members by using a fanoutPoint (fanOutPoint) resource, and oneM2M supports using a multicast mechanism of an underlying network to implement group multicasting, but does not support periodically sending a message to a group in a multicast manner. In addition, a 3rd Generation Partnership Project (3GPP) network supports group multicasting based on a multimedia broadcast/multicast service (Multimedia Broadcast/Multicast Service, MBMS), and supports exposing a group multicasting capability based on a service capability exposure function (Service Capability Exposure Function, SCEF). A group management server or an application server may invoke an interface exposed in the 3GPP network to perform group multicasting based on the MBMS. However, settings of a group at the application layer are not supported in a 3GPP network scenario, and therefore periodically sending a message to a group in a multicast manner cannot be implemented.

In addition, there is a large quantity of capability-limited devices in the internet of things. If these capability-limited devices are limited in memory or power supply, these capability-limited devices may periodically or aperiodically enter a dormant state, and cannot normally receive a message or data. To ensure that these devices can receive a message or data sent by the application server, a method of resending by an application server or a method of buffering and resending by a transmission network or communications network is used in the prior art, increasing performance consumption of the application server, occupying transmission resources of the communications network, and reducing message sending efficiency.

SUMMARY

Embodiments of this application are directed to a message sending method and a device, so that a message may be sent to a terminal within a specified message sending period interval, and it is ensured that the terminal can receive the message within the message sending period interval.

According to a first aspect of this application, a message sending method includes:

obtaining, by a group management server, a message sending period interval corresponding to a first group; sending a TMGI and the message sending period interval to a group member of a multicast group; requesting a communications resource from a communications network based on the TMGI and a start time of the message sending period interval; and receiving, within the message sending period interval, a message sent by an application server, and sending the TMGI and the message to the communications network, where the communications network is enabled to send the message to the group member of the multicast group by using a communications resource corresponding to the TMGI, thereby implementing periodic message multicasting. The group management server sends the message sending period interval to the group member, so that the group member may be well prepared in advance, for example, wake up from a dormant state, and normally receive a message from the group management server within the message sending period interval, and therefore a message sending failure is avoided, and the group management server or the communications network does not need to resend the message. It should be noted that, the group management server may successively send the TMGI and the message sending period interval in different messages to the group member, or may simultaneously send the TMGI and the message sending period interval in a same message to the group member.

Optionally, the obtaining, by a group management server, a message sending period interval corresponding to a first group includes:

receiving, by the group management server, a first group creating request sent by the application server, where the first group creating request includes the message sending period interval; and creating the first group in response to the first group creating request, and setting a message sending time of the first group as the message sending period interval; or receiving, by the group management server, a first group creating request sent by the application server, creating the first group in response to the first group creating request, and receiving a third message sent by the application server, where the third message includes the message sending period interval; and setting a message sending time of the first group as the message sending period interval.

Optionally, the obtaining, by a group management server, a message sending period interval corresponding to a first group includes:

receiving, by the group management server, a first group creating request sent by the application server, where the first group creating request includes the message sending period interval; or receiving, by the group management server, a first group creating request sent by the application server, and receiving a third message sent by the application server, where the third message includes the message sending period interval; and obtaining, by the group management server, an intersection of period intervals within which a group member of the first group may receive a message; and if the message sending period interval is a subset of the intersection, creating, by the group management server, the first group in response to the first group creating request, and setting the message sending time of the first group as the message sending period interval.

Optionally, the group management server further sends a response time window to the group member of the multicast group, and after the group management server sends a second message to the communications network, the method further includes:

receiving, by the group management server during the response time window, a response, sent by the group member of the multicast group based on the response time window, to the first message.

Optionally, the method further includes:

receiving, by the group management server beyond the message sending period interval, the first message sent by the application server, where the first message includes an operation execution time and a request expiration time stamp; and if the operation execution time and the request expiration time stamp are within the message sending period interval, buffering, by the group management server, the first message; and when the start time of the message sending period interval is reached, sending, by the group management server, the second message to the communications network, where the second message includes the TMGI and the first message, and the TMGI is used to instruct the communications network to use the communications resource corresponding to the TMGI to send the first message to the group member of the multicast group.

Optionally, before the group management server sends a request for requesting a communications resource to the communications network, the method further includes:

determining, by the group management server, whether an expiration time of the TMGI is earlier than a start time of the message sending period interval nearest to a current time; and if the expiration time of the TMGI is earlier than the start time of the message sending period interval nearest to the current time, sending, by the group management server, an expiration time update request of the TMGI to the communications network, and receiving a response, sent by the communications network, to the expiration time update request of the TMGI, where the response to the expiration time update request of the TMGI includes an updated expiration time of the TMGI. In this way, validity of the TMGI within the message sending period interval is ensured, and the communications network can normally allocate a communications resource for the TMGI within the message sending period interval. Otherwise, before a message is sent, the group management server needs to first update the TMGI to the communications network or request the TMGI from the communications network, and consequently message sending instantaneity and efficiency are reduced.

Optionally, before the group management server sends the temporary mobile group identity TMGI corresponding to the multicast group and the message sending period interval to the group member of the multicast group, the method further includes: obtaining, by the group management server, a target group member that supports an MBMS in group members included in the first group and that is in a coverage area of the MBMS, and creating the multicast group, where the group member of the multicast group is the target group member.

Optionally, the group member is user equipment UE.

Optionally, information that is about the multicast group and that is recorded by the group management server includes one or more of the TMGI, the expiration time of the TMGI, and the response time window.

According to a second aspect of this application, a message sending method includes:

receiving, by a first group member, a TMGI and a message sending period interval that are sent by a group management server, where the first group member is a group member that supports an MBMS in a first group pre-created by the group management server; and receiving, within the message sending period interval, a message sent by a communications network to a group member of a group corresponding to the TMGI, where periodic message multicasting can be implemented.

Optionally, the message sending period interval includes a start time and an end time, and before the first group member receives, within the message sending period interval, the message sent by the communications network to the group member of the group corresponding to the TMGI, the method further includes:

when the start time of the message sending period interval is reached, if the first group member is in a power saving mode, exiting, by the first group member, the power saving mode, where it is ensured that a message can be normally received within the message sending period interval.

Optionally, the first group member further receives a response time window sent by the group management server, and after the first group member receives, within the message sending period interval, the message sent by the communications network to the group member of the group corresponding to the TMGI, the method further includes:

randomly selecting, by the first group member, a response time from the response time window, and sending a response to the message to the group management server based on the randomly selected response time.

Optionally, information that is about the group corresponding to the TMGI and that is recorded by the first group member includes one or more of the TMGI, the message sending period interval, and the response time window.

According to a third aspect of this application, a group management server includes:

an obtaining module, configured to obtain a message sending period interval corresponding to a first group, where the message sending period interval includes a start time and an end time;

a sending module, configured to send a TMGI corresponding to a multicast group and the message sending period interval to a group member of the multicast group, where the group member of the multicast group is a group member that supports an MBMS in the first group;

the sending module is further configured to send a request for requesting a communications resource to a communications network, where the request for requesting a communications resource includes the TMGI and the start time of the message sending period interval, the TMGI is an identifier assigned by the communications network to the multicast group, and the request for requesting a communications resource is used to request the communications network to provide, for the group member of the multicast group from the start time, a communications resource that is for the MBMS; and a receiving module, configured to receive a first message sent by an application server, where the sending module is further configured to send a second message to the communications network when the receiving module receives the first message within the message sending period interval, where the second message includes the TMGI and the first message, and the TMGI is used to instruct the communications network to send the first message to the group member of the multicast group by using a communications resource corresponding to the TMGI.

Optionally, the obtaining module is configured to:

receive a first group creating request sent by the application server, where the first group creating request includes the message sending period interval;

create the first group in response to the first group creating request, and set a message sending time of the first group as the message sending period interval; or receive a first group creating request sent by the application server;

create the first group in response to the first group creating request;

receive a third message sent by the application server, where the third message includes the message sending period interval; and set a message sending time of the first group as the message sending period interval.

Optionally, the obtaining module is configured to:

receive a first group creating request sent by the application server, where the first group creating request includes the message sending period interval; or receive a first group creating request sent by the application server, and receive a third message sent by the application server, where the third message includes the message sending period interval;

obtain an intersection of period intervals within which a group member of the first group may receive a message; and if the message sending period interval is a subset of the intersection, create the first group in response to the first group creating request, and set a message sending time of the first group as the message sending period interval.

Optionally, the sending module is further configured to send a response time window to the group member of the multicast group; and the receiving module is further configured to receive, during the response time window, a response, sent by the group member of the multicast group based on the response time window, to the first message.

Optionally, the group management server further includes a buffer module, where the buffer module is configured to buffer the first message when the receiving module receives the first message beyond the message sending period interval, the first message includes an operation execution time and a request expiration time stamp, and the operation execution time and the request expiration time stamp are within the message sending period interval; and the sending module is further configured to: when the start time of the message sending period interval is reached, send a second message to the communications network, where the second message includes the TMGI and the first message, and the TMGI is used to instruct the communications network to send the first message to the group member of the multicast group by using a communications resource corresponding to the TMGI.

Optionally, the group management server further includes a determining module, where the determining module is configured to determine whether an expiration time of the TMGI is earlier than a start time of the message sending period interval nearest to a current time;

the sending module is further configured to: when a determining result of the determining module is that the expiration time of the TMGI is earlier than the start time of the message sending period interval nearest to the current time, send an expiration time update request of the TMGI to the communications network; and the receiving module is further configured to receive a response, sent by the communications network, to the expiration time update request of the TMGI, where the response to the expiration time update request of the TMGI includes an updated expiration time of the TMGI.

Optionally, the group management server further includes a creating module, where the obtaining module is further configured to obtain a target group member that supports an MBMS in group members included in the first group and that is in a coverage area of the MBMS; and the creating module is configured to create the multicast group, where the group member of the multicast group is the target group member.

Optionally, the group member is user equipment UE.

Optionally, information that is about the multicast group and that is recorded by the group management server includes one or more of the TMGI, the expiration time of the TMGI, and the response time window.

According to a fourth aspect of this application, a terminal includes: a processor, a communications interface, and a memory, where the memory stores an instruction, the communications interface is controlled by the processor to receive and send a message. The processor is configured to invoke the instruction, to perform a message sending method in taccordance with one or more embodiments.

According to a fifth aspect of this application, a computer program product including an instruction is provided, and when the instruction runs on a computer, the computer is enabled to perform a message sending method in accordance with one or more embodiments.

In the embodiments of this application, the group management server obtains the message sending period interval corresponding to the first group; sends the temporary mobile group identity TMGI and the message sending period interval to the group member of the multicast group; requests the communications resource from the communications network based on the TMGI and the start time of the message sending period interval; and receives, within the message sending period interval, the message sent by the application server, and sends the TMGI and the message to the communications network, so that the communications network uses the communications resource corresponding to the TMGI to send the message to the group member of the multicast group, thereby implementing periodic message multicasting.

It should be noted that, the method in which the group management server sends the message sending period interval to the group member and sends the message within the message sending period interval and that is provided in the first aspect and the second aspect is not only applicable to the group member of the multicast group in the first group, but also applicable to any group member of the first group. For a group member that does not support the MBMS in the first group, the group management server may also send the message sending period interval to the group member that does not support the MBMS in the first group. After receiving the first message sent by the application server, the group management server sends, within the message sending period interval, the first message to the group member that does not support the MBMS in the first group, and the first message may be forwarded by the communications network. Compared with the method that is provided in the first aspect and the second aspect and in which the group management server sends the message to the group member of the multicast group in the first group, in a method in which the first group includes a group member that does not support the MBMS, the group management server does not need to request, from the communications network, the TMGI and the resource that is for the MBMS.

BRIEF DESCRIPTION OF DRAWINGS

To describe technical solutions in embodiments of this application or in the background more clearly, the following briefly describes the accompanying drawings for describing the embodiments of this application or the background.

DESCRIPTION OF EMBODIMENTS

The following describes embodiments of this application with reference to the accompanying drawings in the embodiments of this application.

Figure 1:
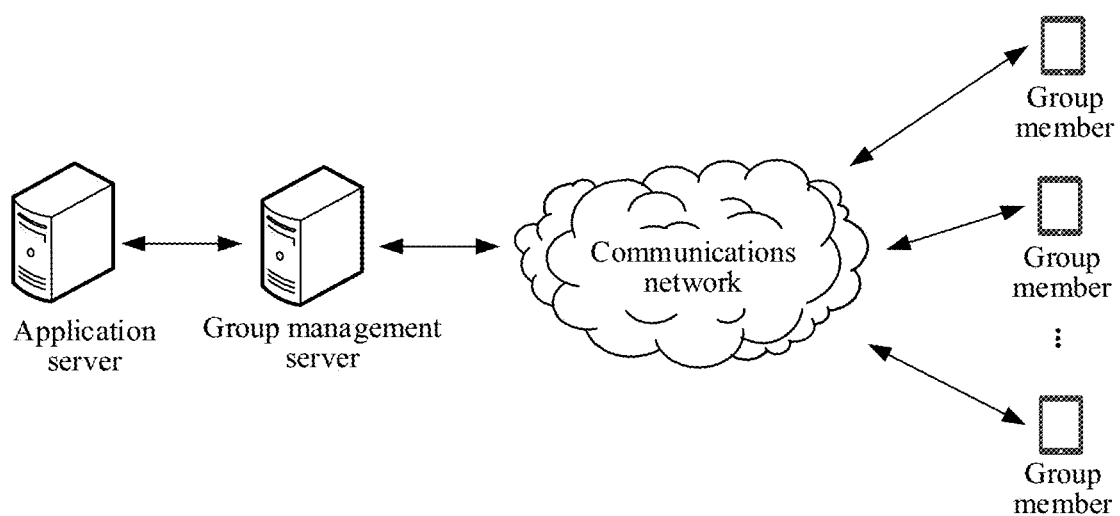
FIG. 1 is a schematic architectural diagram of a message sending system according to an embodiment of this application.

FIG. 1 is a schematic architectural diagram of a message sending system according to an embodiment of this application. The message sending system in this embodiment includes:

an application server, which may be an application entity (AE), or the like, is located at an application layer, may implement an M2M application service logic, and is configured to deliver a message to a group member by using a group management server and a communications network;

the group management server, which may be a service capability server (SCS), or the like, is configured to create and maintain a group, and forward, to the group member by using the communications network, the message delivered by the application server;

the communications network, which may be a 3GPP network, or may be an Internet protocol (IP) network, is configured to provide a communications resource used for the group management server to forward the message to the group member;

and the group member, which may be user equipment (UE), or the like, is configured to receive the message delivered by the application server by using the group management server and the communications network, and perform an action indicated in the message.

Currently, oneM2M supports using a multicast mechanism of an underlying network to implement group multicasting, and a 3GPP network also supports group multicasting based on an MBMS, and supports exposing a group multicasting capability by using an SCEF. However, periodically sending a message to a group in a multicast manner cannot be implemented by an application server by using the multicast mechanism of the underlying network or by the 3GPP network by using the group multicasting capability based on the MBMS.

The embodiments of this application disclose a message sending method and a device, so that periodic message multicasting can be implemented. The following separately provides detailed descriptions.

Figure 2:
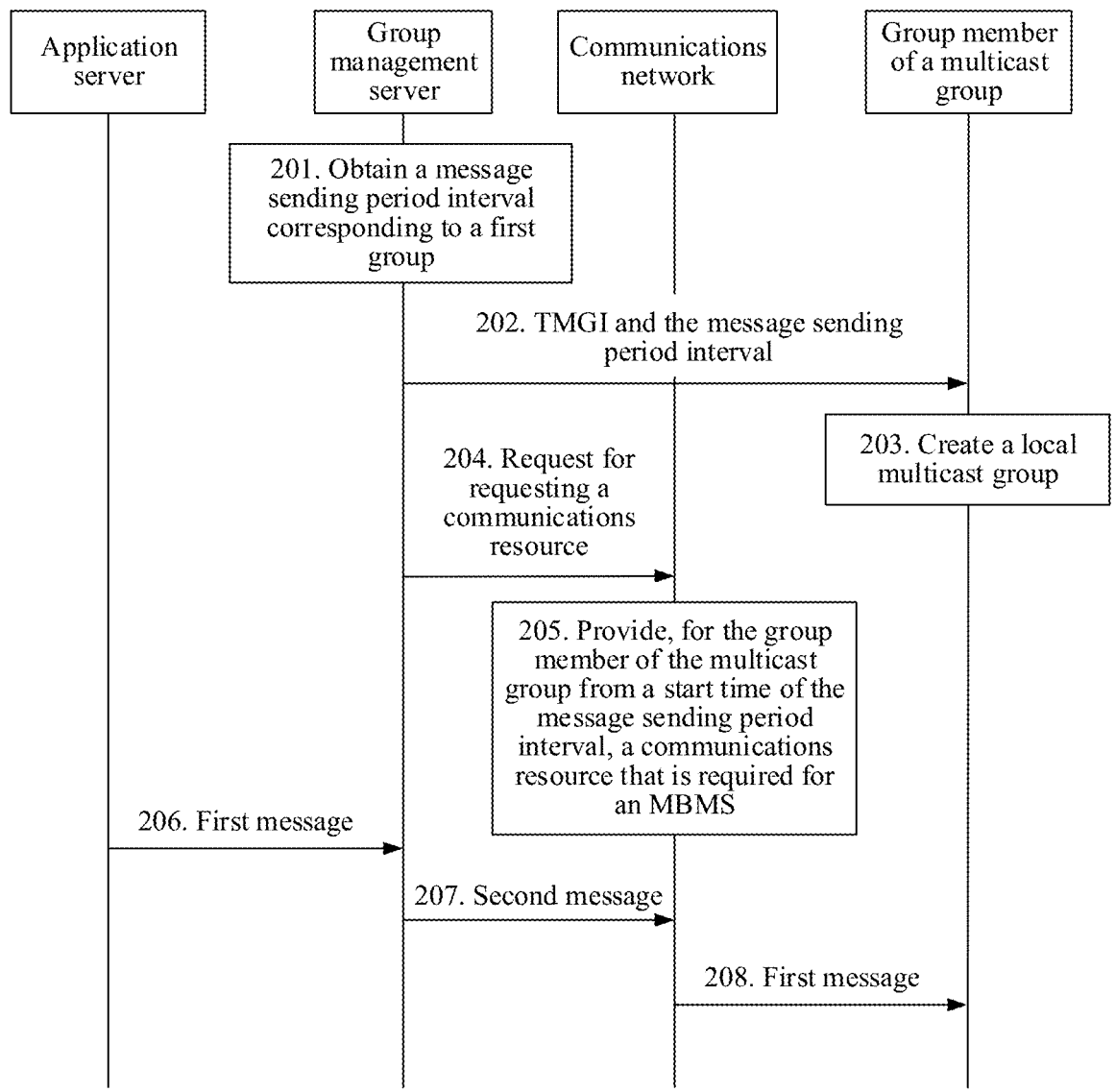
FIG. 2 is a schematic flowchart of a message sending method according to an embodiment of this application.

FIG. 2 is a schematic flowchart of a message sending method, provided based on an architecture of the message sending system shown in FIG. 1, according to an embodiment of this application. The message sending method described in this embodiment includes the following steps.

Step 201. A group management server obtains a message sending period interval corresponding to a first group.

The message sending period interval is a time interval within which a message is sent to a group, and includes a start time an end time. For example, a message is sent to a group within a time interval corresponding to a start time and an end time of each period. The message sending period interval may include one or more time intervals. For example, the message sending period interval includes two time intervals, namely every Tuesday from 10:00 PM to 12:00 PM, and every Thursday from 10:00 PM to 12:00 PM, and the message may be sent to the group within the message sending period interval, to implement periodic management and maintenance of a group member, including system upgrade, battery capacity check, and the like of the group member. The message sending period interval may be set by an application server according to an actual requirement, and sent to the group management server.

During specific implementation, the group management server may receive a first group creating request sent by the application server, where the first group creating request includes the message sending period interval and identification information of a group member included in the first group. For example, the application server may send the message sending period interval to the group management server by using the first group creating request.

Figure 3:
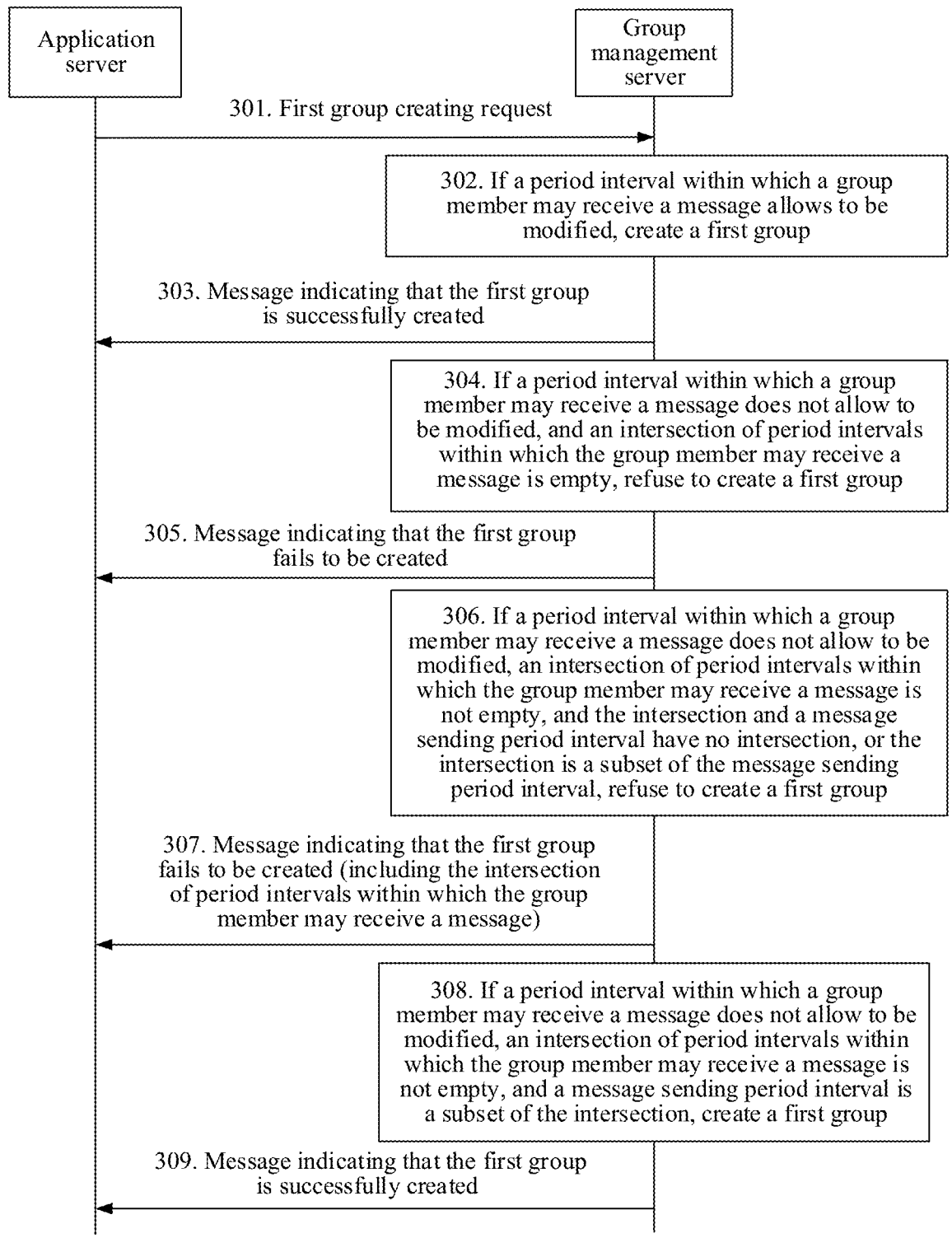
FIG. 3 is a schematic flowchart of creating a group according to an embodiment of this application.

Further, before creating the first group in response to the first group creating request, the group management server needs to determine whether a period interval within which the group member may receive a message allows to be updated. A specific implementation procedure is shown in FIG. 3, and may include the following steps:

Steps 301 to 303. The group management server receives the first group creating request sent by the application server; and if the period interval within which the group member may receive a message allows to be modified, it indicates that a period interval within which each group member may receive a message may be modified, to ensure that each group member can receive a message within a same time interval, the group management server may respond to the first group creating request, create the first group based on the identification information of the group member included in the first group, and set a message sending time of the first group as the message sending period interval, and the group management server may further return a message indicating that the first group is successfully created to the application server.

Steps 304 and 305. If the period interval within which the group member may receive a message does not allow to be modified, the group management server may first obtain an intersection of period intervals within which all group members may receive a message; and if the intersection is empty, it indicates that each group member cannot receive a message within a same time interval, and the group management server returns a message indicating that the first group fails to be created to the application server.

Steps 306 and 307. If the period interval within which the group member may receive a message does not allow to be modified, and if an intersection of period intervals within which all group members may receive a message is not empty, but the intersection of period intervals within which all group members may receive a message and the message sending period interval has no intersection, or the intersection of period intervals within which all group members may receive a message is a subset of the message sending period interval, it indicates that the group member cannot receive a message within the message sending period interval, or that the group member can receive a message within only a part of time of the message sending period interval, and the group management server may return a message indicating that the first group fails to be created to the application server, the message indicating that the first group fails to be created may include the intersection of period intervals within which all group members may receive a message, and the application server may adjust the message sending period interval based on the intersection of period intervals within which all group members may receive a message, so that the adjusted message sending period interval is a subset of the intersection of period intervals within which all group members may receive a message, and the adjusted message sending period interval may be used to send the first group creating request again to the group management server.

Steps 308 and 309. If the period interval within which the group member may receive a message does not allow to be modified, and if an intersection of period intervals within which all group members may receive a message is not empty, and the message sending period interval is a subset of the intersection of period intervals within which all group members may receive a message, it indicates that the group member may receive a message within the message sending period interval, the group management server may respond to the first group creating request, create the first group based on the identification information of the group member included in the first group, and set a message sending time of the first group as the message sending period interval, and the group management server may further return a message indicating that the first group is successfully created to the application server.

The message sending period interval may be recorded as schedule, and the group management server adds a new sub-resource <schedule> to a group resource <group> of the first group.

It should be noted that, the group member shown in FIG. 3 may include only a group member of a multicast group, in other words, the message sending period interval is valid for only the group member of the multicast group; or may include all group members of the first group, in other words, the message sending period interval is valid for all the group members of the first group.

Step 202. The group management server sends a temporary mobile group identity TMGI and the message sending period interval to the group member of the multicast group.

Correspondingly, the group member of the multicast group receives the TMGI and the message sending period interval.

In a possible implementation, before the step 202, the message sending method may further include the following steps of creating the multicast group.

A specific implementation in which the group management server selects a group member from the first group to create the multicast group may be: The group management server obtains a group member that supports a multimedia broadcast/multicast service (MBMS) in the group member included in the first group, obtains a coverage area in which the MBMS is provided, determines a group member that supports the MBMS and that is in the MBMS coverage area as a target group member, and creates the multicast group by using the target group member as the group member, where the group member of the multicast group is an object to which a message is periodically sent by the application server based on the message sending period interval.

Further, after the group management server creates the multicast group, the message sending method may further include the following steps of requesting the temporary mobile group identity (TMGI).

A specific implementation in which the group management server requests the TMGI from a communications network may be: The group management server sends a request for requesting the TMGI to the communications network, where the request for requesting the TMGI includes a requested quantity of TMGIs; and receives a TMGI list and an expiration time of the TMGI that are sent by the communications network based on the requested quantity of TMGIs, where the TMGI list includes the requested quantity of TMGIs, each TMGI corresponds to one expiration time, and one TMGI corresponds to one multicast group.

The communications network may include at least a service capability exposure function (SCEF) and a broadcast/multicast service center (BM-SC).

The group management server records information about the multicast group, and adds attributes, namely the TMGI and the expiration time of the TMGI into the information about the multicast group multicast group information, and adds an enumeration value, namely a periodic 3GPP multicast group, which is recorded as periodic_3GPP_MBMS_group, to an existing attribute, namely a multicast type, and the group management server sets a multicast type of the multicast group as periodic_3GPP_MBMS_group.

During specific implementation, the group management server may send the TMGI and the message sending period interval to the group member of the multicast group in a unicast, multicast, or broadcast manner.

Step 203. The group member of the multicast group creates a local multicast group.

During specific implementation, the group member of the multicast group joins, based on the TMGI, in a multicast group multicast group corresponding to the TMGI, and creates the local multicast group.

It should be noted that, the local multicast group is a record or resource that is locally created by the group member of the multicast group, a function of the local multicast group is to record related information about the multicast group (namely the multicast group corresponding to the TMGI) to which the group member belongs, and the group member of the multicast group may record the TMGI and the message sending period interval by using the resource, namely the local multicast group. For example, the attribute, namely the TMGI, and the sub-resource <schedule> may be added to the local multicast group resource <localMulticastGroup>. Certainly, the group member of the multicast group may also use another manner to record the related information about the multicast group to which the group member belongs.

Further, after creating the local multicast group, the group member of the multicast group may return a response message to the group management server.

Step 204. The group management server sends a request for requesting a communications resource to the communications network.

Correspondingly, the communications network receives the request for requesting a communications resource, and provides, for the group member of the multicast group from the start time, a communications resource that is for the MBMS.

The request for requesting a communications resource includes the TMGI and the start time startime of the message sending period interval, and the TMGI is an identifier assigned by the communications network to the group member of the multicast group.

In a possible implementation, before the step 204, the message sending method may further include the following step:

A specific implementation in which the group management server determines whether the TMGI expires, and if it is determined that the TMGI expires, the group management server requests a renewal from the communications network may be: The group management server determines whether the expiration time of the TMGI is earlier than a start time of the message sending period interval nearest to a current time. For example, the current time is Monday 10:00 AM, the message sending period interval is every Tuesday from 10:00 PM to 12:00 PM, so that the start time of the message sending period interval nearest to the current time is 10:00 PM the next day (that is, Tuesday). The group management server compares the expiration time of the TMGI with Tuesday 10:00 PM, and if the expiration time of the TMGI is earlier than Tuesday 10:00 PM, the group management server determines that the TMGI expires when Tuesday 10:00 PM is reached and if the expiration time of the TMGI is not updated, the group management server may send an expiration time update request of the TMGI to the communications network, and the communications network extends the expiration time of the TMGI, and sends a response to the expiration time update request of the TMGI to the group management server, where the response to the expiration time update request of the TMGI includes an updated expiration time of the TMGI.

Step 205. The communications network provides, for the group member of the multicast group from the start time of the message sending period interval, the communications resource that is for the MBMS.

During specific implementation, before the start time of the message sending period interval is reached, the group management server sends the request for requesting a communications resource to the communications network, and the communications network may provide, for the group member of the multicast group from the start time of the message sending period interval, the communications resource that is for the MBMS, where the communications resource that is for the MBMS is a communications resource corresponding to the TMGI.

Figure 4:
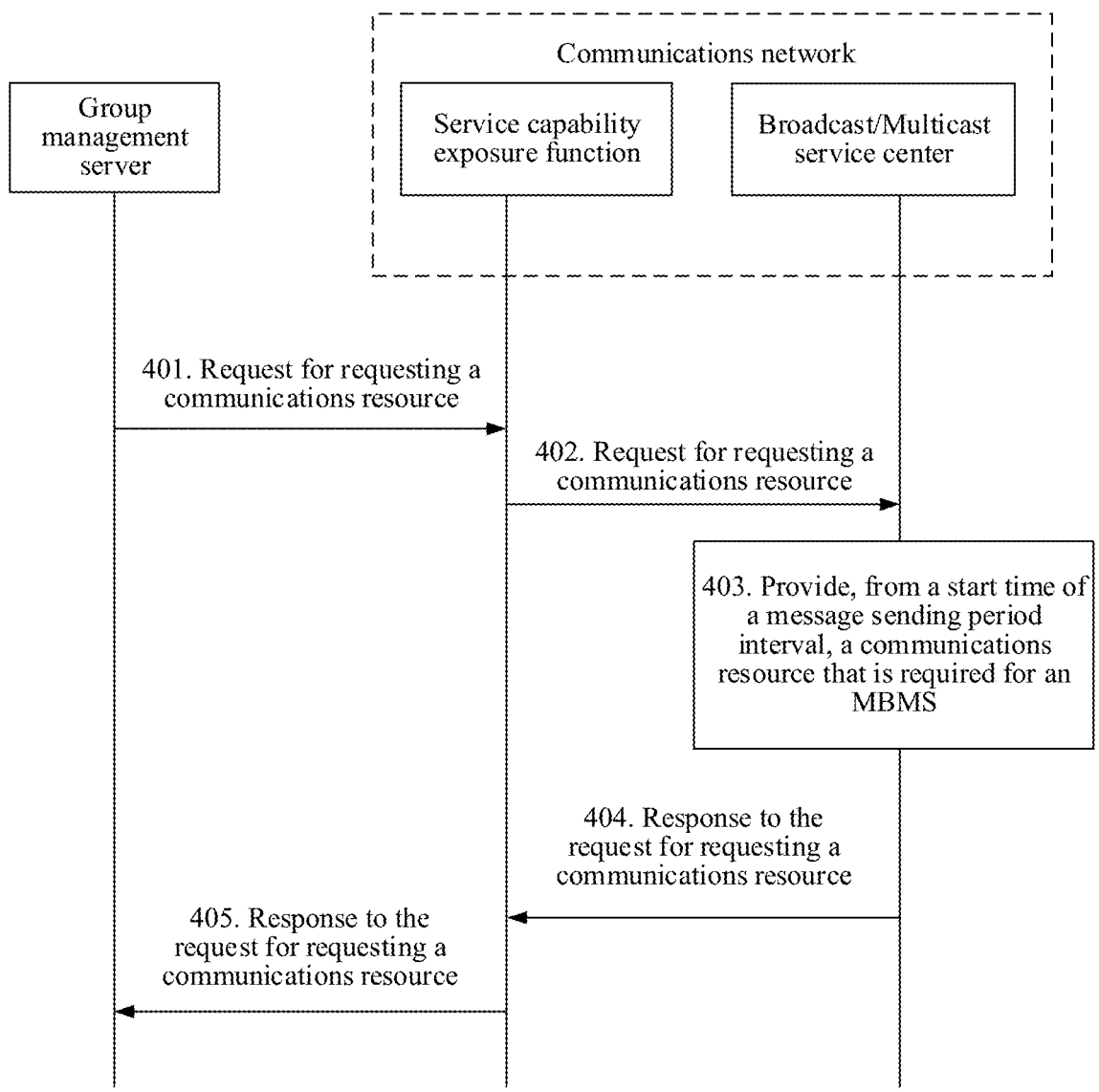
FIG. 4 is a schematic flowchart requesting a communications resource according to an embodiment of this application.

In a possible implementation, a specific implementation procedure of the steps 204 and 205 is shown in FIG. 4, and may include the following steps:

Steps 401 to 405. The group management server sends the request for requesting a communications resource to a service capability exposure function, where the request for requesting a communications resource may include the TMGI and the start time startime of the message sending period interval; the service capability exposure function forwards the request for requesting a communications resource to the broadcast/multicast service center; the broadcast/multicast service center may provide, for the group member of the multicast group from the start time startime of the message sending period interval, the communications resource that is for the MBMS, and sends a response to the request for requesting a communications resource to the service capability exposure function, where the response to the request for requesting a communications resource may include the TMGI, service description service description, an IP address of the broadcast/multicast service center, a port port number, and the like; and the service capability exposure function forwards the response to the request for requesting a communications resource to the group management server.

Step 206. The application server sends a first message to the group management server within the message sending period interval.

Correspondingly, the group management server receives the first message sent by the application server.

During specific implementations, the application server may periodically send a message (recorded as the first message) to the group management server within the message sending period interval, and the group management server receives the first message.

Step 207. The group management server sends a second message to the communications network, where the second message includes the TMGI and the first message.

Correspondingly, the communications network receives the second message.

During specific implementations, after receiving the first message sent by the application server within the message sending period interval, the group management server may send the first message to the group member of the multicast group by using the communications network, for example, the group management server may send the second message to the communications network, where the second message includes the TMGI and the first message.

Step 208. The communications network sends the first message to the group member of the multicast group by using the communications resource corresponding to the TMGI.

Correspondingly, the group member of the multicast group receives the first message within the message sending period interval.

During specific implementations, after receiving the second message, the communications network obtains the TMGI included in the second message, and sends the first message to the group member of the multicast group by using the communications resource corresponding to the TMGI, and the group member of the multicast group monitors, within the message sending period interval, the first message carried on the communications resource corresponding to the TMGI, to implement that the application server periodically sends a message to the group member of the multicast group.

In a possible implementation, when the start time of the message sending period interval is reached, the group member of the multicast group determines a working mode of the group member, and if the group member of the multicast group is in a power saving mode (PSM), the group member of the multicast group exits the power saving mode, and then monitors, within the message sending period interval, the first message carried on the communications resource corresponding to the TMGI, so as to avoid waste of group message resources caused because the group member is in the power saving mode and cannot receive a message.

In a possible implementation, the first message may include a response uniform resource identifier (response URI), and a value of the response URI indicates the group management server, so that the group member of the multicast group may send a response to the received first message to the group management server based on the resource URI. The group management server may further send a response time window to the group member of the multicast group, the response time window may be set by the group management server, and the attribute, namely the response time window is added to the information about the multicast group multicast group information recorded by the group management server and the local multicast group resource <localMulticastGroup> locally recorded by the group member. After receiving the first message and completing an operation corresponding to the first message, the group member of the multicast group may randomly select a response time from the response time window when sending the response to the first message to the group management server based on the response URI, and send the response to the first message to the group management server based on the randomly selected response time. Correspondingly, during the response time window, the group management server receives the response, sent by the group member of the multicast group, to the first message, aggregates the response sent by the group member of the multicast group, and sends the aggregated response to the application server.

Figure 5:
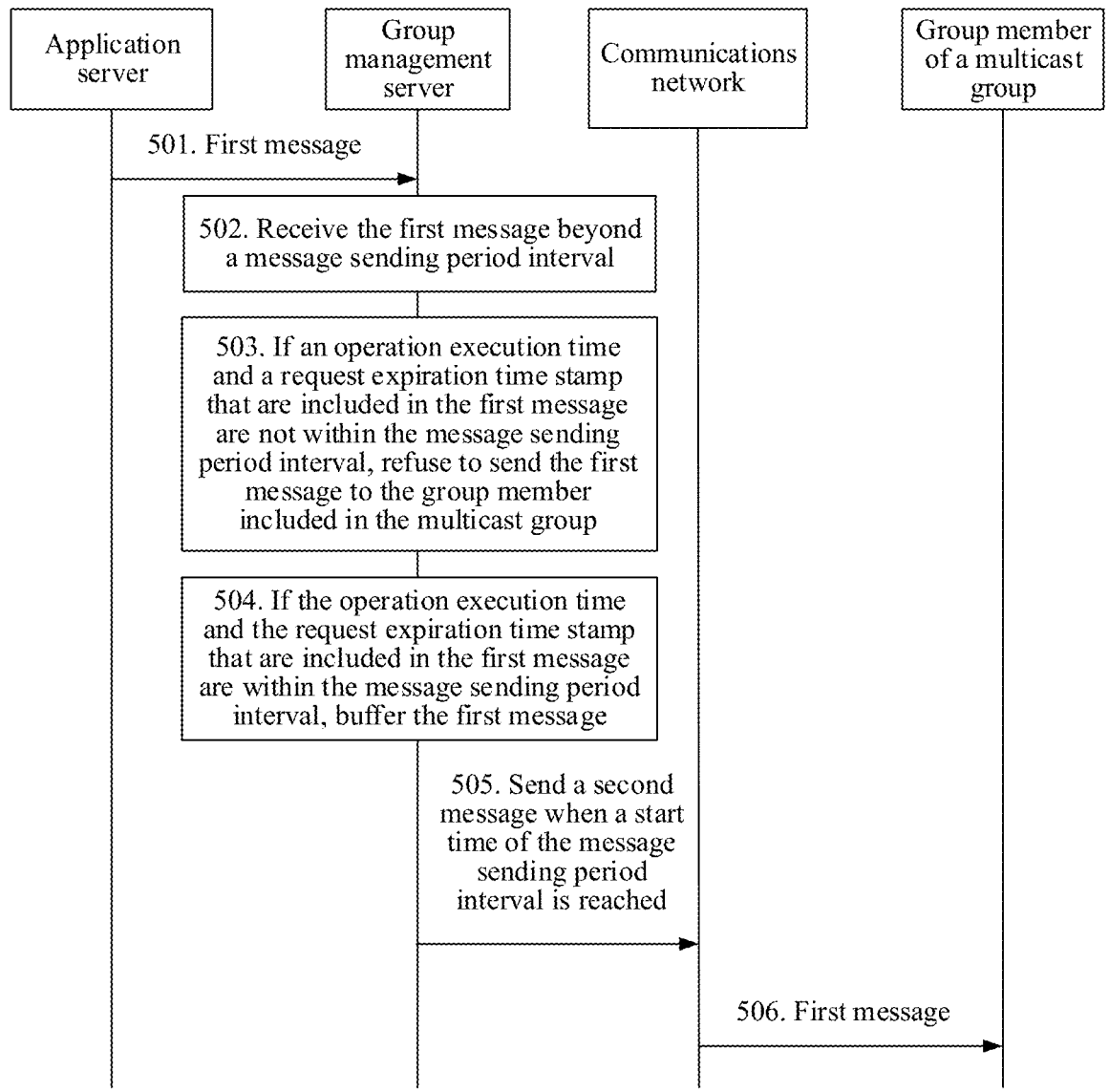
FIG. 5 is a schematic flowchart of sending a message according to an embodiment of this application.

In a possible implementation, the application server may also send a message to the group member of the multicast group in a multicast manner beyond the message sending period interval, a specific implementation procedure is shown in FIG. 5, and may include the following steps:

Steps 501 to 503. The application server sends the first message to the group management server beyond the message sending period interval; the group management server receives the first message sent by the application server, obtains an operation execution time and a request expiration time stamp that are included in the first message, determines whether the operation execution time and the request expiration time stamp are within the message sending period interval; and if the operation execution time and the request expiration time stamp are not within the message sending period interval, the group management server may refuse to send the first message to the group member of the multicast group, and may return, to the application server, a response message indicating that the first message fails to be sent.

Steps 503 to 506. If the operation execution time and the request expiration time stamp are within the message sending period interval, the group management server may first buffer the first message, and then when the start time of the message sending period interval is reached, send the first message to the group member of the multicast group by using the communications network.

It should be noted that, in this embodiment of this application, that the communications network is a 3GPP network is used as an example. The message sending method provided in this embodiment of this application may also be applicable to another type of communications network, for example, an IP network, or the like.

In this embodiment of this application, the group management server obtains the message sending period interval corresponding to the first group, and sends the TMGI and the message sending period interval to the group member of the multicast group, and the group member of the multicast group joins in the multicast group, and creates the local multicast group; the group management server requests the communications resource from the communications network based on the TMGI and the start time of the message sending period interval, and the communications network provides, for the group member of the multicast group from the start time, the communications resource that is for the MBMS; the group management server receives, within the message sending period interval, the first message sent by the application server, and sends the TMGI and the first message to the communications network; the communications network sends the first message to the group member of the multicast group by using the communications resource corresponding to the TMGI; and the group member of the multicast group receives the first message within the message sending period interval, to implement periodic message multicasting, and improve flexibility during message multicasting.

Figure 2A:
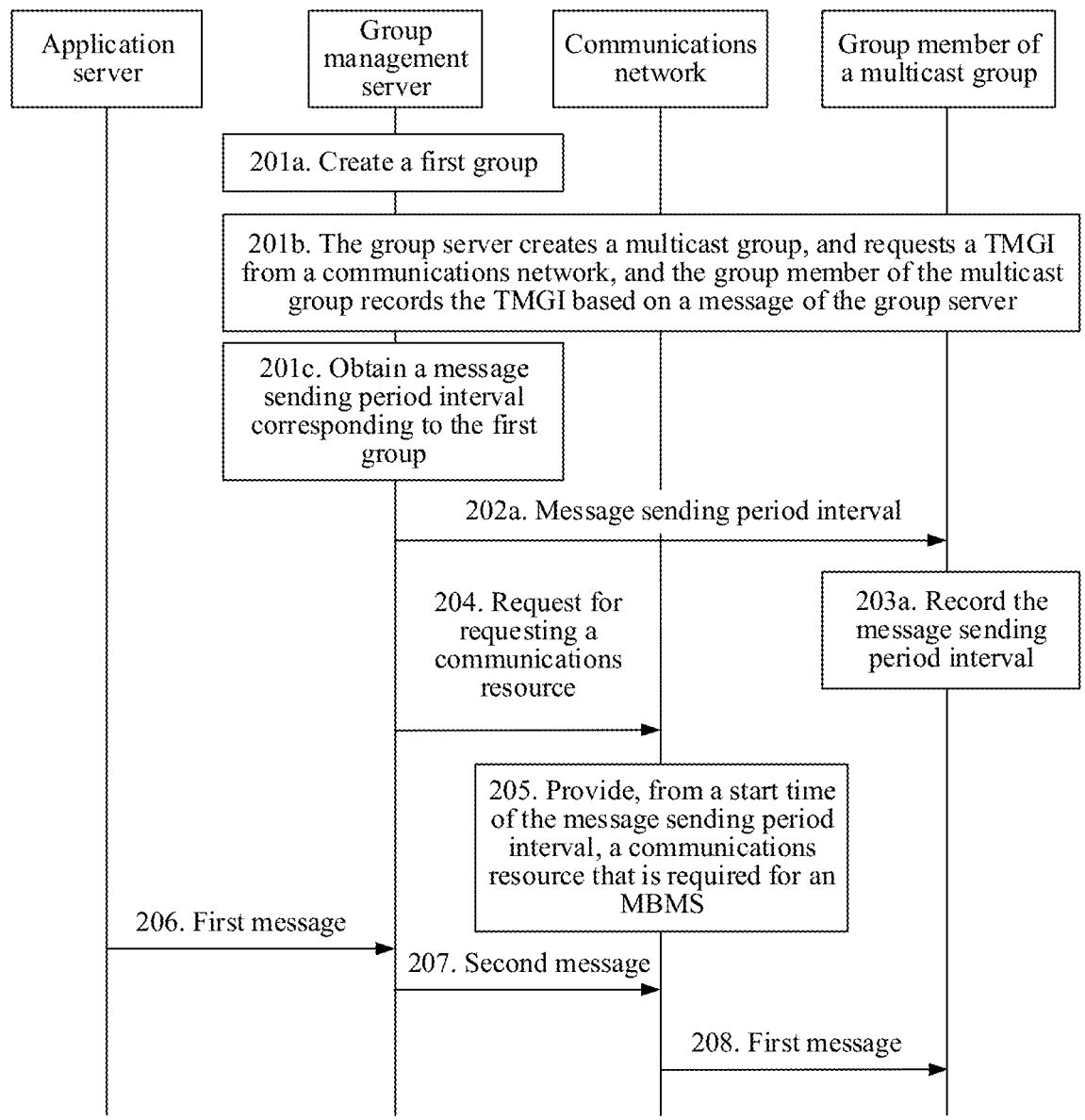
FIG. 2a is another schematic flowchart of a message sending method according to an embodiment of this application.

In a possible implementation, the message sending period interval and the first group creating request may alternatively be separately sent, which may be: The application server sends the first group creating request and a third message to the group management server, where the third message includes the message sending period interval. A flowchart of separately creating the first group and the message sending period interval is shown in FIG. 2a, for messages or steps of same numbers as those in FIG. 2, reference may be made to descriptions in FIG. 2, and details are not described herein again. Messages or steps that are of newly added numbers in FIG. 2a or of different numbers from those in FIG. 2 are described in the following:

Step 201a. The group management server creates the first group. A manner that the group management server is triggered to create the first group is not limited in this embodiment. For example, the group management server may create the first group based on a request of the application server, and the request of the application server includes an identifier of the group member included in the first group.

Step 201b. When the first group includes a group member that supports the MBMS, the group management server may select, from the first group, the group member that supports the MBMS, to create the multicast group. For a method and step of creating the multicast group, reference may be made to step description of creating the multicast group in the step 202 in FIG. 2. The group management server may further request the TMGI from the communications network, and for a specific step, reference may be made to step description of requesting the TMGI in the step 202 in FIG. 2. The group management server may further send the TMGI to the group member of the multicast group in a unicast, multicast, or broadcast manner. For processing after the group member of the multicast group receives the TMGI, reference may be made to the description of the step 203 in FIG. 2.

Figure 3A:
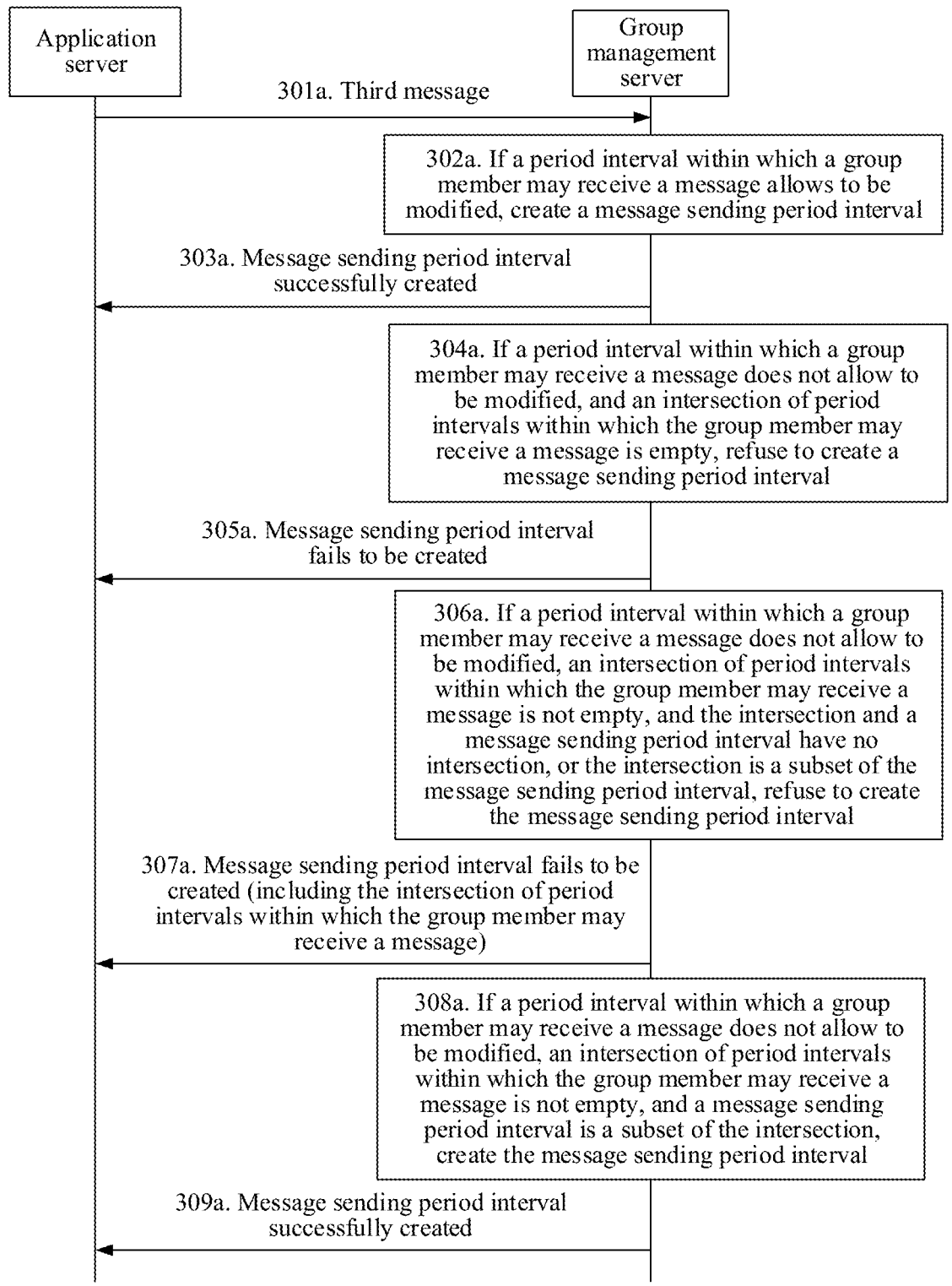
FIG. 3a is a schematic flowchart of creating a message sending period interval according to an embodiment of this application.

Step 201C. The group management server obtains the message sending period interval corresponding to the first group. A manner in which the group management server obtains the message sending period interval corresponding to the first group is not limited in this embodiment. For example, the group management server may create, based on the request of the application server, a corresponding message sending period interval for the first group, and a request message sent by the application server includes an identifier of the first group and the message sending period interval. It should be noted that, the application server may learn of information, about the first group, created on the group management server (including a group identifier, the message sending period interval, and the like). For example, when the group management server creates the first group or the message sending period interval based on the request of the application server, the application server may learn of, from a response message sent by the group management server, the information about the first group. For example, when the group management server creates the first group or the message sending period interval based on an operation maintenance instruction, the application server may also learn of the information about the first group through query. A flowchart in which the group management server creates the message sending period interval for the first group is shown in FIG. 3a. Step descriptions in FIG. 3a are basically the same as those in FIG. 3. A difference lies in that the third message shown in step 301a is a message for requesting to create the message sending period interval. steps 302a, 304a, 306a and 308a are steps of processing and determining in creating the message sending period interval by the group management server on a premise that the first group is already created. Correspondingly, steps 303a, 305a, 307a, and 309a are response messages indicating that the message sending period interval is successfully created or fails to be created.

Step 202a. After the message sending period interval of the first group is successfully created, when the first group includes a multicast subgroup, the group management server sends the message sending period interval to the group member of the multicast group. The group management server may send the message sending period interval to the group member of the multicast group in a unicast, multicast, or broadcast manner.

Step 203a. The group member of the multicast group records the message sending period interval corresponding to the multicast group to which the group member belongs. The group member of the multicast group may add a sub-resource <schedule> to a local multicast group resource <localMulticastGroup>, or may record related information about the multicast group to which the group member belongs in another manner.

Procedures and steps in which the group management server creates the message sending period interval corresponding to the first group, notifies the group member of the multicast group in the first group, and sends a message to the group member of the multicast group within the message sending period interval are described in FIG. 2 and FIG. 2a. Possible implementations and procedures of the embodiment in FIG. 2 are similar to the method procedures in FIG. 4 and FIG. 5, and are also applicable to the embodiment shown in FIG. 2a, and details are not described herein again.

It should be noted that, when the first group does not include a group member that does not support the MBMS, that is, all group members of the first group belong to the multicast group, the group member in FIG. 3a is actually the group member of the multicast group. When the first group further includes the group member that does not support the MBMS, and the group member in FIG. 3a includes only the group member of the multicast group, the message sending period interval is valid only for the group member of the multicast group. When the first group further includes a group member that does not support the MBMS, and the group member in FIG. 3a is all group members of the first group, the message sending period interval is applicable to all the group members of the first group. In FIG. 2 and FIG. 2a, after determining the message sending period interval corresponding to the first group, the group management server needs to further notify another group member that does not support the MBMS in the first group of the message sending period interval corresponding to the first group. In addition, after the group mangement server receives the first message, the group management server further sends, within the message sending period interval, the first message to the group member that does not support the MBMS in the first group. A manner in which the group management server sends the message sending period interval and the first message to the group member that does not support the MBMS in the first group is not limited in this embodiment, and may be a unicast manner, an IP multicast manner, or another manner. In addition, to send, within the message sending period interval, the first message to the group member that does not support the MBMS in the first group, the group management server also needs to perform, before sending the first message to the group member that does not support the MBMS in the first group, steps 502 to 504.

Figure 2B:
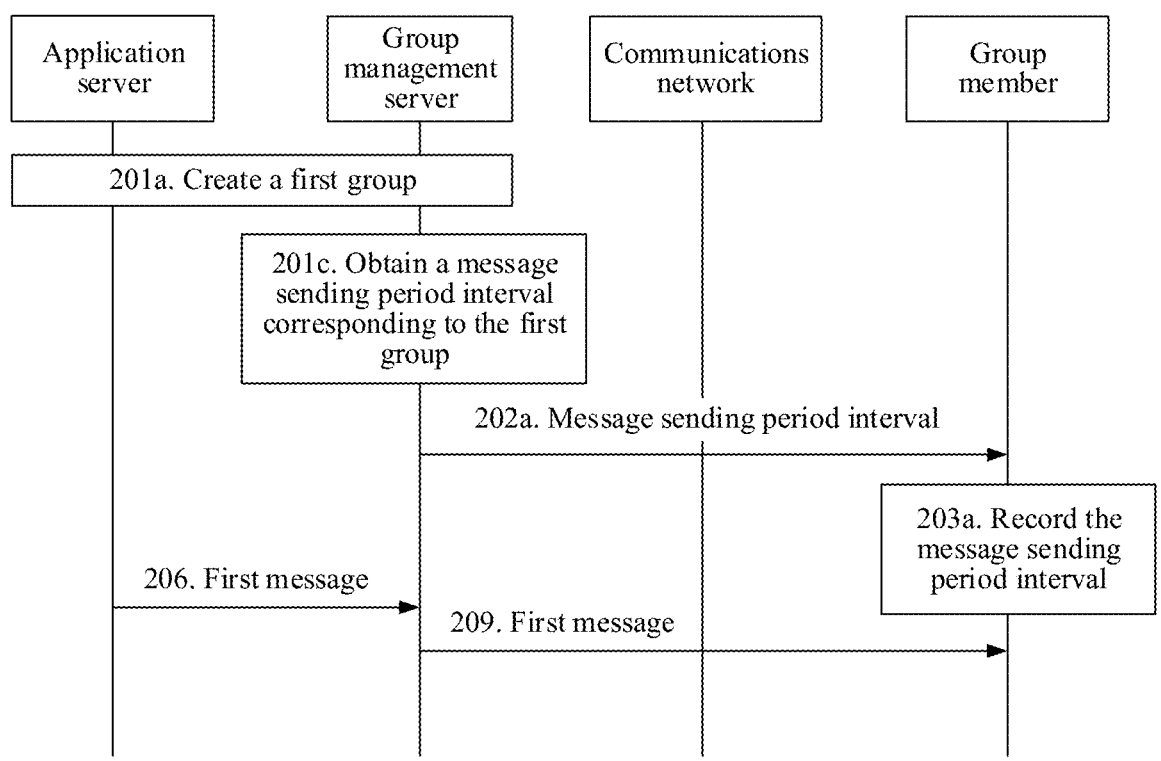
FIG. 2b is still another schematic flowchart of a message sending method according to an embodiment of this application.

It should be further noted that, in the procedure described in FIG. 2a, in a case in which the first group does not include a group member that supports the MBMS, a procedure of creating the message sending period interval corresponding to the first group, and sending a message to the gourp member of the first group within the message sending period interval is shown in FIG. 2b. Compared with FIG. 2a, a procedure and step that are related to the multicast group are not included in FIG. 2b, and other steps are the same as those in FIG. 2a. In addition, because the group member of the first group does not support the MBMS, in FIG. 2b, the group management server sends the first message to the group member by using step 209. A manner of sending the first message by using step 209 may be a unicast manner, an IP multicast manner, or another manner, and is not limited in this embodiment. To send, within the message sending period interval, the first message to the group member that does not support the MBMS in the first group, the group management server also needs to perform steps 502 to 504 before sending, within the message sending period interval, the first message to the group member that does not support the MBMS in the first group.

Figure 6:
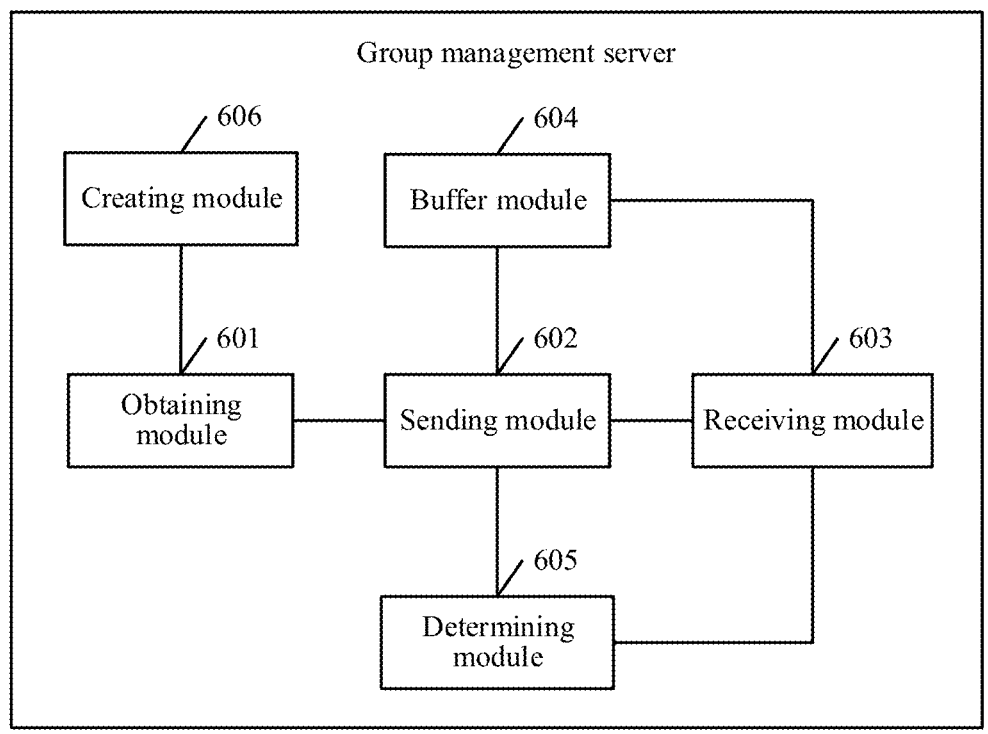
FIG. 6 is a schematic structural diagram of a group management server according to an embodiment of this application.

FIG. 6 is a schematic structural diagram of a group management server according to an embodiment of this application. The group management server includes:

an obtaining module 601, configured to obtain a message sending period interval corresponding to a first group, where the message sending period interval includes a start time and an end time;

a sending module 602, configured to send the message sending period interval to a group member of a multicast group in the first group, and further configured to send a TMGI to the group member of the multicast group in the first group, where the group member of the multicast group is a group member that supports an MBMS in the first group, where the sending module 602 is further configured to send a request for requesting a communications resource to a communications network, where the request for requesting a communications resource includes the TMGI and the start time of the message sending period interval, the TMGI is an identifier assigned by the communications network to the multicast group, and the request for requesting a communications resource is used to request the communications network to provide, for the group member of the multicast group from the start time, a communications resource that is required for the MBMS; and a receiving module 603, configured to receive a first message sent by an application server, where the sending module 602 is further configured to send a second message to the communications network when the receiving module 603 receives the first message within the message sending period interval, where the second message includes the TMGI and the first message, and the TMGI is used to instruct the communications network to send the first message to the group member of the multicast group by using a communications resource corresponding to the TMGI.

Optionally, the obtaining module 601 is configured to:

receive a first group creating request sent by the application server, where the first group creating request includes the message sending period interval;

create the first group in response to the first group creating request, and set a message sending time of the first group as the message sending period interval; or receive a first group creating request sent by the application server;

create the first group in response to the first group creating request;

receive a third message sent by the application server, where the third message includes the message sending period interval; and set a message sending time of the first group as the message sending period interval.

Optionally, the sending module 602 is further configured to send a response time window to the group member of the multicast group.

The receiving module 603 is further configured to receive, during the response time window, a response, sent by the group member of the multicast group based on the response time window, to the first message.

Optionally, the group management server further includes a buffer module 604, where the buffer module 604 is configured to buffer the first message when the receiving module receives the first message beyond the message sending period interval, where the first message includes an operation execution time and a request expiration time stamp, and the operation execution time and the request expiration time stamp are within the message sending period interval; and the sending module 602 is further configured to: when the start time of the message sending period interval is reached, send a second message to the communications network, where the second message includes the TMGI and the first message, and the TMGI is used to instruct the communications network to send the first message to the group member of the multicast group by using a communications resource corresponding to the TMGI.

Optionally, the group management server further includes a determining module 605, where the determining module 605 is configured to determine whether an expiration time of the TMGI is earlier than a start time of the message sending period interval nearest to a current time;

the sending module 602 is further configured to: when a determining result of the determining module is that the expiration time of the TMGI is earlier than the start time of the message sending period interval nearest to the current time, send an expiration time update request of the TMGI to the communications network; and the receiving module 603 is further configured to receive a response, sent by the communications network, to the expiration time update request of the TMGI, where the response to the expiration time update request of the TMGI includes an updated expiration time of the TMGI.

Optionally, the group management server further includes a creating module 606, where the obtaining module 601 is further configured to obtain a target group member that supports the MBMS in a group member included in the first group and that is in a coverage area of the MBMS; and the creating module 606 is configured to create the multicast group, where the group member of the multicast group is the target group member.

Optionally, the group member is UE.

Optionally, information that is about the multicast group and that is recorded by the group management server includes one or more of the TMGI, the expiration time of the TMGI, and the response time window.

It may be understood that functions of the function modules of the group management server in this embodiment may be implemented according to the method in the foregoing method embodiment. For specific implementation processes of the functions, reference may be made to related descriptions of the foregoing method embodiment, and details are not described herein again.

In this embodiment of this application, the obtaining module 601 obtains the message sending period interval corresponding to the first group; the sending module 602 sends the temporary mobile group identity TMGI and the message sending period interval to the group member of the multicast group, and the sending module 602 requests the communications resource from the communications network based on the TMGI and the start time of the message sending period interval; the receiving module 603 receives, within the message sending period interval, the message sent by the application server; and the sending module 602 sends the TMGI and the message to the communications network, so that the communications network sends the message to the group member of the multicast group by using the communications resource corresponding to the TMGI, thereby implementing periodic message multicasting, and improving flexibility during message multicasting.

Figure 7:
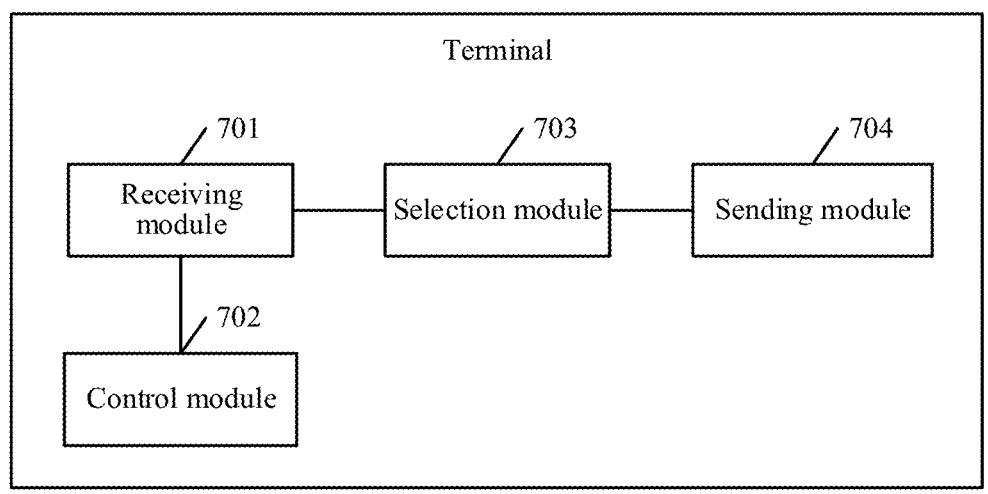
FIG. 7 is a schematic structural diagram of a terminal according to an embodiment of this application.

FIG. 7 is a schematic structural diagram of a terminal according to an embodiment of this application. The terminal includes:

a receiving module 701, configured to receive a TMGI and a message sending period interval that are sent by a group management server, where the terminal is a group member that supports an MBMS in a first group pre-created by the group management server, and the TMGI is a group identifier assigned by a communications network to the group member that supports the MBMS in the first group, where the receiving module 701 is further configured to receive, within the message sending period interval, a message sent by the communications network to a group member of a group corresponding to the TMGI.

Optionally, the message sending period interval includes a start time and an end time, and the terminal further includes:

a control module 702, configured to: when the start time of the message sending period interval is reached, if the terminal is in a power saving mode, control the terminal to exit the power saving mode.

Optionally, the terminal further includes a selection module 703 and a sending module 704, where the receiving module 701 is further configured to receive a response time window sent by the group management server;

the selection module 703 is configured to randomly select a response time from the response time window; and the sending module 704 is configured to send a response to the message to the group management server based on the randomly selected response time.

Optionally, information that is about the group corresponding to the TMGI and that is recorded by the terminal includes one or more of the TMGI, the message sending period interval, and the response time window.

It may be understood that, functions of function modules of the terminal in this embodiment may be implemented according to the method in the foregoing method embodiment. For specific implementation processes of the functions, reference may be made to related descriptions of the foregoing method embodiment, and details are not described herein again.

In this embodiment of this application, the receiving module 701 receives the TMGI and the message sending period interval that are sent by the group management server, and receives, within the message sending period interval, the message that is sent by the communications network to the group member of the group corresponding to the TMGI, thereby implementing periodic message multicasting, and improving flexibility during message multicasting.

Figure 8:
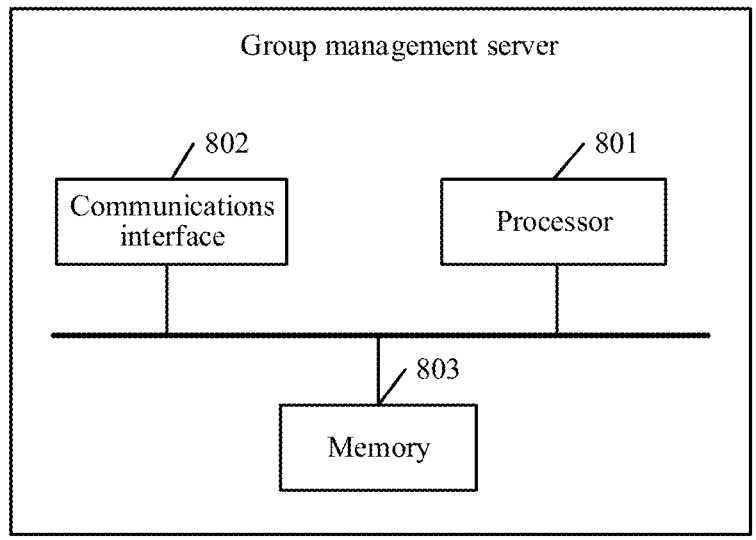
FIG. 8 is a schematic structural diagram of another group management server according to an embodiment of this application.

FIG. 8 is a schematic structural diagram of another group management server according to an embodiment of this application. The group management server includes: a processor 801, a communications interface 802, and a memory 803, where the processor 801, the communications interface 802, and the memory 803 may be connected by using a bus or in another manner. In this embodiment of this application, a bus connection is used as an example.

The processor 801 (or referred to as a central processing unit (CPU)) is a computing core and a control core of the group management server. Optionally, the communications interface 802 may include a standard wired interface, and a wireless interface (for example, a WI-FI interface, a mobile communications interface, or the like), and is controlled by the processor 801 to receive and send data. The memory 803 is a memory apparatus of the group management server, and is configured to store a program and data. It may be understood that, the memory 803 herein may be a high speed RAM memory, or may be a non-volatile memory, for example, at least one magnetic disk storage. Optionally, the memory 803 may be at least one storage device disposed away from the processor 801. The memory 803 provides storage space. The storage space stores an operating system and executable program code that are of the group management server, which include but are not limited to a windows system (an operating system), Linux (an operating system), and the like. This is not limited in this application.

During specific implementations, the processor 801, the communications interface 802, and the memory 803 that are described in this embodiment of this application may perform the implementation of the group management server described in the procedures in FIG. 2 to FIG. 5 in the embodiments of this application, and may also perform the implementation of the group management server provided in FIG. 6 in the embodiments of this application. Details are not described herein again.

In this embodiment of this application, the processor 801 obtains a message sending period interval corresponding to a first group; the communications interface 802 sends a temporary mobile group identity TMGI and the message sending period interval to a group member of a multicast group, and the communications interface 802 requests a communications resource from the communications network based on the TMGI and a start time of the message sending period interval, and receives, within the message sending period interval, a message sent by an application server; and the processor 801 sends the TMGI and the message to the communications network, so that the communications network sends the message to the group member of the multicast group by using a communications resource corresponding to the TMGI, thereby implementing periodic message multicasting, and improving flexibility during message multicasting.

Figure 9:
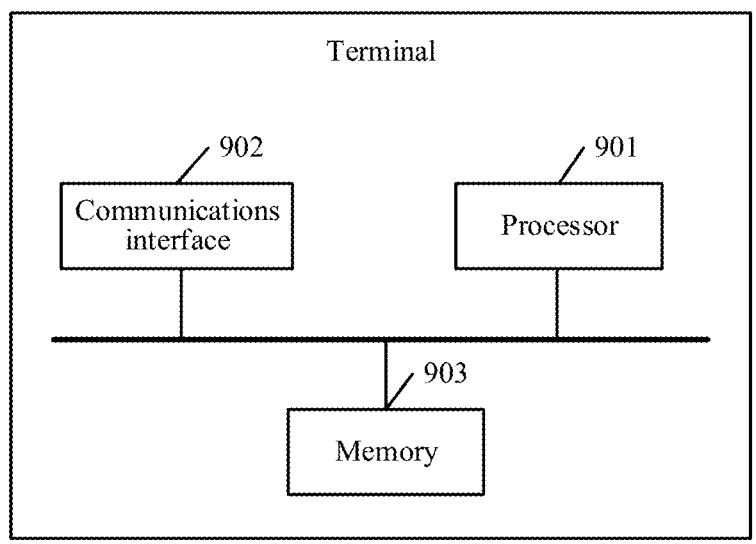
FIG. 9 is a schematic structural diagram of another terminal according to an embodiment of this application.

FIG. 9 is a schematic structural diagram of another terminal according to an embodiment of this application. The terminal includes: a processor 901, a communications interface 902, and a memory 903, where the processor 901, the communications interface 902, and the memory 903 may be connected by using a bus or in another manner. In this embodiment of this application, a bus connection is used as an example.

The processor 901 (or CPU) is a computing core and a control core of the terminal. Optionally, the communications interface 902 may include a standard wired interface, and a wireless interface (for example, a WI-FI interface, a mobile communications interface, or the like), and is controlled by the processor 901 to receive and send data. The memory 903 is a memory apparatus of the terminal, and is configured to store a program and data. It may be understood that, the memory 903 herein may be a high speed RAM memory, or may be a non-volatile memory (non-volatile memory), for example, at least one magnetic disk storage. Optionally, the memory 903 may be at least one storage device disposed away from the processor 901. The memory 903 provides storage space. The storage space stores an operating system and executable program code that are of the terminal, which include but are not limited to a windows system (an operating system), Linux (an operating system), an Android system (an operating system), an IOS system (an operating system), and the like. This is not limited in this application.

During specific implementations, the processor 901, the communications interface 902, and the memory 903 that are described in this embodiment of this application may perform the implementation of the terminal described in the procedures in FIG. 2 and FIG. 5 in the embodiments of this application, and may also perform the implementation of the terminal provided in FIG. 7 in the embodiments of this application. Details are not described herein again.

In this embodiment of this application, the communications interface 902 receives a TMGI and a message sending period interval that are sent by a group management server, and receives, within the message sending period interval, a message that is sent by a communications network to a group member of a group corresponding to the TMGI, thereby implementing periodic message multicasting, and improving flexibility during message multicasting.

The foregoing embodiments may be all or partially implemented by software, hardware, firmware or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, or microwave) manner. The computer-readable storage medium may be any available medium accessible by a computer, or a data storage device, for example, a server or a data center, integrating one or more available media. The usable medium may be a magnetic medium (for example, a floppy disk, a hard disk, or a magnetic tape), an optical medium (for example, a DVD), a semiconductor medium (for example, a solid state disk (SSD), or the like.

The foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A message sending method, comprising:
   receiving, by a group management server, a first group creating request sent by an application server, wherein the first group creating request comprises a first message sending period interval;
   sending, by the group management server, the first message sending period interval to a group member of the first group at a time outside the first message sending period interval, wherein the group member is caused to be ready to receive a communication from the group management server within the first message sending period interval based on the first message sending period interval sent by the group management server;
   receiving, by the group management server, a first message sent by the application server; and
   sending, by the group management server, the first message to the group member of the first group within the first message sending period interval,
   wherein the group member of the first group supports a multimedia broadcast/multicast service (MBMS).

2. The method according to claim 1, wherein the method further comprises:
   receiving, by the group management server, a second message sent by the application server, wherein the second message comprises an identifier of the first group and a second message sending period interval;
   setting, by the group management server, a message sending time of the first group as the second message sending period interval; and
   sending, by the group management server, the second message sending period interval to the group member of the first group.

3. The method according to claim 1, further comprising:
   creating, by the group management server, the first group based on the first group creating request; and
   setting, by the group management server, a message sending time of the first group as the first message sending period interval.

4. The method according to claim 1, wherein the receiving, by the group management server of the first message sent by the application server, and sending, by the group management server, the first message to the group member of the first group within the first message sending period interval, comprises:
   receiving, by the group management server beyond the first message sending period interval, the first message sent by the application server, wherein the first message comprises an operation execution time and a request expiration time stamp;
   buffering, by the group management server, the first message based on a determination that the operation execution time and the request expiration time stamp are within the first message sending period interval, and
   sending, by the group management server, the first message to the group member of the first group when a start time of the first message sending period interval is reached.

5. The method according to claim 1, wherein the receiving, by the group management server of the first message sent by the application server, and sending, by the group management server, the first message to the group member of the first group within the first message sending period interval, comprises:
   receiving, by the group management server within the first message sending period interval, the first message sent by the application server; and
   sending, by the group management server, the first message to the group member of the first group.

6. The method according to claim 1, wherein the first group comprises a multicast group that includes a multicast group member, the group member of the first group that supports the MBMS is the multicast group member and, before the sending by the group management server of the first message to the group member of the first group, the method further comprises:
   sending, by the group management server, a request for requesting a communications resource to a communications network, wherein the request for requesting the communications resource comprises a temporary mobile group identity (TMGI) corresponding to the multicast group and a start time of the first message sending period interval, the TMGI is an identifier assigned by the communications network to the multicast group, and the request for requesting the communications resource is used to request the communications network to provide, for the multicast group member corresponding to the TMGI from the start time, a communications resource for the MBMS.

7. The method according to claim 6, wherein the sending, by the group management server of the first message to the group member of the first group, comprises:
   sending, by the group management server, a second message to the communications network, wherein the second message comprises the TMGI and the first message, the TMGI is used to instruct the communications network to send the first message to the multicast group member by using a communications resource corresponding to the TMGI, and the communications resource corresponding to the TMGI is the communications resource for the MBMS and that is provided, for the multicast group member corresponding to the TMGI by the communications network based on the request for requesting the communications resource.

8. The method according to claim 6, wherein before the sending, by the group management server of the request for requesting the communications resource to the communications network, the method further comprises:
   determining, by the group management server, whether an expiration time of the TMGI is earlier than the start time of the first message sending period interval nearest to a current time;

sending, by the group management server, an expiration time update request of the TMGI to the communications network based on a determination that the expiration time of the TMGI is earlier than the start time of the first message sending period interval nearest to the current time; and receiving, by the group management server, a response to the expiration time update request of the TMGI, sent by the communications network, wherein the response to the expiration time update request of the TMGI comprises an updated expiration time of the TMGI.

9. The method according to claim 6, wherein before the sending, by the group management server of the request for requesting the communications resource to the communications network, the method further comprises:

obtaining, by the group management server, a target group member that supports the MBMS in the group member included in the first group and that is in a coverage area of the MBMS;

creating, by the group management server, the multicast group, wherein the multicast group member is the target group member; and requesting and obtaining, by the group management server from the communications network, the TMGI corresponding to the multicast group, and sending the TMGI to the multicast group member.

10. The method according to claim 8, wherein the group management server records information about the multicast group, and the information about the multicast group comprises one or more of the TMGI, the expiration time of the TMGI, and a response time window.

11. The method according to claim 10, wherein the group management server sends the response time window to the multicast group member and, after the group management server sends the first message to the multicast group member, the method further comprises:

receiving, by the group management server during the response time window, a response to the first message, sent by the group member of the first group based on the response time window.

12. The method according to claim 1, wherein the group member is user equipment UE.

13. A message sending method, comprising:

receiving, by a first group member, a message sending period interval sent by a group management server at a time outside the message sending period interval, wherein the first group member is a group member of a first group created by the group management server, and the group member is caused to be ready to receive a communication from the group management server within the message sending period interval based on the message sending period interval sent by the group management server; and receiving, by the first group member within the message sending period interval, a message sent by the group management server, wherein the first group member supports a multimedia broadcast/multicast service (MBMS).

14. The method according to claim 13, wherein the message sending period interval comprises a start time and an end time, and before the receiving, by the first group member within the message sending period interval of the message sent by the group management server, the method further comprises:

exiting, by the first group member, a power saving mode based on a determination that the first group member is in the power saving mode when the start time of the message sending period interval is reached.

15. The method according to claim 13, wherein the first group member further receives a response time window sent by the group management server and, after the receiving by the first group member within the message sending period interval of the message sent by the group management server, the method further comprises:

selecting, by the first group member, a response time from the response time window; and sending a response to the message to the group management server based on the selected response time.

16. The method according to a claim 15, wherein the first group member further receives a temporary mobile group identity (TMGI) sent by the group management server, where the TMGI is a group identifier assigned by a communications network to the first group member for supporting the MBMS in the first group, and the receiving, by the first group member within the message sending period interval of the message sent by the group management server comprises: receiving, by the first group member within the message sending period interval, a message sent by the communications network to a group member of a group corresponding to the TMGI, wherein the message is sent by the group management server to the communications network.

17. The method according to claim 16, wherein the first group member records information about the group corresponding to the TMGI, and the information about the group corresponding to the TMGI comprises one or more of the TMGI, the message sending period interval, or the response time window.

18. A non-transitory computer readable medium having computer executable instructions stored thereon that, when executed by a processor, cause an apparatus to:

receive, by a group management server, a first group creating request sent by an application server, wherein the first group creating request comprises a first message sending period interval;

send, by the group management server, the first message sending period interval to a group member of the first group at a time outside the first message sending period interval, wherein the group member is caused to be ready to receive a communication from the group management server within the first message sending period interval based on the first message sending period interval sent by the group management server;

receive, by the group management server, a first message sent by the application server; and send, by the group management server, the first message to the group member of the first group within the first message sending period interval, wherein the group member of the first group supports a multimedia broadcast/multicast service (MBMS).

19. The method according to claim 2, wherein the setting, by the group management server of the message sending time of the first group as the first message sending period interval, comprises:

obtaining, by the group management server, an intersection of period intervals within which the group member of the first group may receive a message; and setting, by the group management server, the message sending time of the first group as the first message sending period interval based on a determination that the first message sending period interval is a subset of the intersection.

\* \* \* \* \*